United States Patent [19]

Rotter

[11] Patent Number: 5,314,140
[45] Date of Patent: *May 24, 1994

[54] TAPE CARTRIDGE DRIVE BELT HAVING A LOW RATIO OF STATIC TO DYNAMIC FRICTION

[75] Inventor: Gerhard Rotter, Mission Viejo, Calif.

[73] Assignee: Athana Incorporated, Torrance, Calif.

[*] Notice: The portion of the term of this patent subsequent to Apr. 20, 2010 has been disclaimed.

[21] Appl. No.: 999,306

[22] Filed: Dec. 31, 1992

Related U.S. Application Data

[63] Continuation-in-part of Ser. No. 662,755, Mar. 1, 1991, Pat. No. 5,203,519.

[51] Int. Cl.[5] .................... B65H 20/06; G11B 15/26
[52] U.S. Cl. .................................................. 242/192
[58] Field of Search ................ 242/192; 226/170; 474/249, 237

[56] References Cited

U.S. PATENT DOCUMENTS 5,203,519  4/1993  Rotter ........................ 242/192

Primary Examiner—Daniel P. Stodola
Assistant Examiner—John Q. Nguyen
Attorney, Agent, or Firm—Freilich Hornbaker Rosen

[57] ABSTRACT

A magnetic tape cartridge incorporating a drive belt characterized by a smooth (e.g., average surface roughness less than 7 microinches, zero to peak, as measured by a Talysurf 10 surface analyzer set for a 0.003 cut off length) nontextured drive surface and a ratio of static to dynamic coefficients of friction between the drive surface and the magnetic tape surface, of less than 2. The drive belt is preferably integrally formed of a material which inherently yields the aforementioned drive surface characteristics without requiring that the naturally formed belt surface be specially treated.

3 Claims, 2 Drawing Sheets

TAPE CARTRIDGE DRIVE BELT HAVING A LOW RATIO OF STATIC TO DYNAMIC FRICTION

RELATED APPLICATIONS

This application is a continuation-in-part of U.S. application Ser. No. 07/662,755 filed Mar. 1, 1991, now U.S. Pat. No. 5,203,519.

FIELD OF THE INVENTION

The present invention pertains to belt driven magnetic tape cartridges and more particularly, to drive belts therefor.

BACKGROUND OF THE INVENTION

In a bidirectional drive tape cartridge of the type shown in U.S. Pat. No. 3,692,255 in which the tape moves at high speeds between two reels and is subjected to high accelerations when the tape direction is reversed, it is important to minimize tape tension variations at the transducer head. Otherwise tape to head contact may be lost and data compromised.

U.S Pat. Nos. 4,581,189 and 4,466,564 disclose drive belts, typically made of polyurethane, for use in such tape cartridges particularly configured to minimize tape tension variations characterized as flutter. More particularly, the disclosed drive belts are described as having a microscopically rough surface between 0.2 and 40 micrometers (8 to 1600 microinches) peak to peak to promote the release of air from between the belt and the tape for the purpose of minimizing variations in tape tension and speed.

Applicant's parent application Ser. No. 07/662,755 filed Mar. 1, 1991 describes a magnetic tape cartridge including an improved drive belt for engaging a magnetic tape to transport the tape between first and second spaced reels. The drive belt improvement is based on the recognition that variations in tape tension and speed can be minimized by minimizing the difference between the static and dynamic friction between the engaged surfaces of the tape and drive belt. More specifically, Applicant's parent application describes a drive belt having a smooth nontextured drive surface having a frictional characteristic relative to the tape surface such that the ratio of static to dynamic coefficients of friction between the surfaces is less than 2.

SUMMARY OF THE INVENTION

The present invention is directed to a magnetic tape cartridge incorporating a preferred drive belt embodiment characterized by a smooth (e.g., average surface roughness less than 7 microinches, zero to peak, as measured by a Talysurf 10 surface analyzer set for a 0.003 cut off length) nontextured drive surface and a ratio of static to dynamic coefficients of friction between the drive surface and the magnetic tape surface, of less than 2.

In accordance with a preferred embodiment, the drive belt is integrally formed of a material which inherently yields the aforementioned drive surface characteristics without requiring that the naturally formed belt surface be specially treated. A preferred commercially available material for a drive belt in accordance with the present invention comprises a polyester polyurethane material having high slip characteristics such as that sold under the trademark TUFTANE, TF-330 by Tuftane, Inc. of Glouster, Mass.

In an alternative embodiment, the belt need not be integrally formed. Rather, the drive surface can be formed by depositing a thin layer of a suitable material, e.g., TUFTANE TF-330, onto a substantially conventional drive belt.

The novel features of the invention are set forth with particularity in the appended claims. The invention will be best understood from the following description when read in conjunction with the accompanying drawings.

BRIEF DESCRIPTION OF DRAWINGS

FIGS. 1,2,3,4,5,5A and 5B are identical to correspondingly numbered figures in Applicant's parent application Ser. No. 07/662,755.

FIG. 1 is a sectional plan view of a typical magnetic tape cartridge;

FIG. 2 is a sectional view along the line 2-2 of FIG. 1;

FIG. 3 is an illustration of belt and tape tensions on a take up reel of the tape cartridge of FIG. 1;

FIG. 4 is a graph of belt tension as a function of distance along the belt in the direction of belt motion on the take up reel of FIG. 3;

FIG. 5A is a sectional view of a drive belt in accordance with the current invention;

FIG. 5B is a section view of an alternative drive belt, in accordance with the current invention.

DETAILED DESCRIPTION

Figure 1:
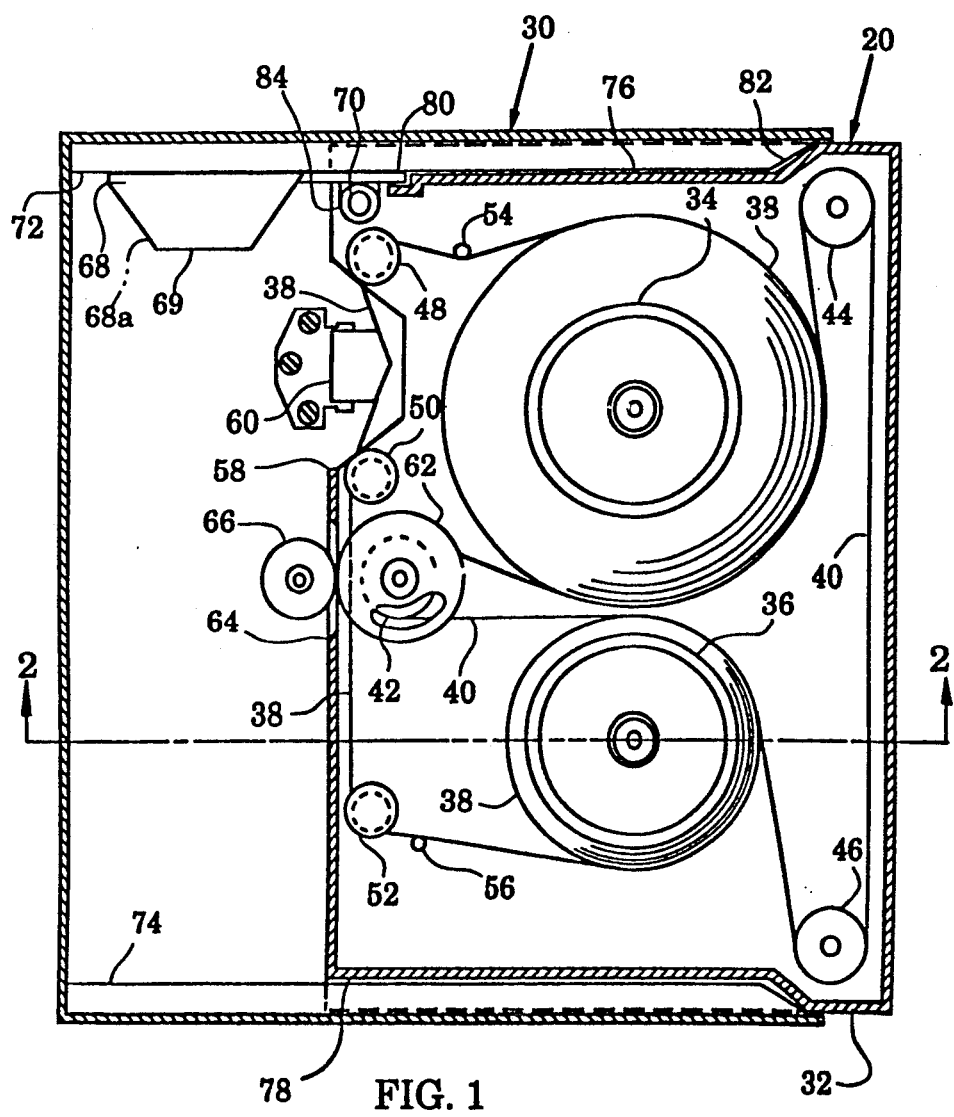

FIG. 1 is a sectional view of an exemplary belt driven tape cartridge 20. The tape cartridge 20, which is shown positioned in a support deck 30, has a shell 32 in which a pari of reels 34, 36 are mounted with a magnetic tape 38 convolutely wound thereon. A resilient belt 40 closely contacts the tape 38 wound about each reel 34, 36. The belt 40 also is let around a belt drive roller 42 and a pair of belt guide rollers 44, 46. Thus the belt 40 moves linearly in response to rotation of the belt drive roller 42 to cause the reels 34, 36 to rotate by means of surface friction between the belt 40 and the magnetic tape 38.

The magnetic tape 38 passes around three tape guides 48, 50, and 52. Between the reel 34 and the tape guide 48, the magnetic tape 38 is led over a tape wrap pin 54. The magnetic tape 38 passes over a similar tape wrap pin 56 between the reel 36 and the tape guide 52. The tape guides 48, 50 are positioned on either side of an opening 58 in the shell 32 where a transducer head 60, mounted on the support deck 30, contacts the magnetic tape 38.

The belt drive roller 42 has a rim portion 62 which contacts, through an aperture 64 in the shell 32, a drive roller 66 which extends up from the support deck 30. Thus the drive roller 66, through the belt drive roller 42 and its rim 62, can drive the belt 40 in either direction causing the magnetic tape 38 to pass over the transducer head 60 as it is exchanged between the reels 34, 36.

A door 68, having a flange 69 corresponding to the opening 58, is pivotally mounted on a pivot stud 70 and covers the opening 58 except when the tape cartridge 20 is inserted into the support deck 30. When inserted, cartridge guides 72, 74 in the support deck slide into recesses 76, 78 in the shell 32 and a tab 80 on the door 68 is pushed aside by the bevel 82 on the guide 72. The door 68 thus swings to the open position 68a shown in FIG. 1 making the magnetic tape 38 available for contact with the transducer head 60 through the opening 58. The door 68 is urged by a spring 84 which causes it to close over the opening 58 upon removal of the tape cartridge 20 from the support deck 30.

Figure 2:
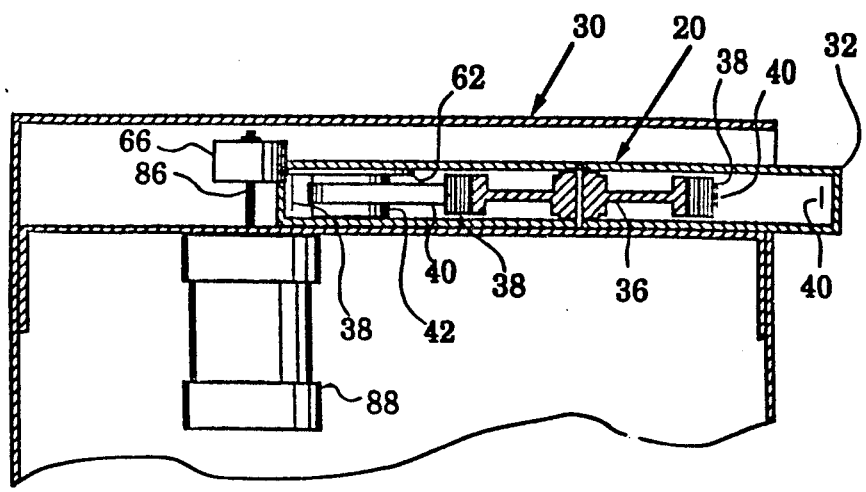

FIG. 2 is a view along the line 2—2 of FIG. 1 and shows the tape cartridge 20 in the support deck 30. The drive roller 66 extends upward on a drive shaft 86 from a reversible motor 88 and contacts the rim 62 of the belt drive roller 42 through the aperture (64 in FIG. 1) in the shell 32. The belt 40 is seen to contact the belt drive roller 42 and the magnetic tape 38 convolutely wound on the reel 36. The magnetic tape 38 is also shown passing under the rim 62 of the belt drive roller 42.

The reels 34, 36, the belt drive roller 42 and the belt guide rollers 44, 46 shown in FIGS. 1 and 2 are rotatably mounted on axles which are fixed in the shell 32. The belt drive roller 42 and the belt guide rollers 44, 46 are preferably crowned to keep the belt 40 positioned thereon.

Figure 3:
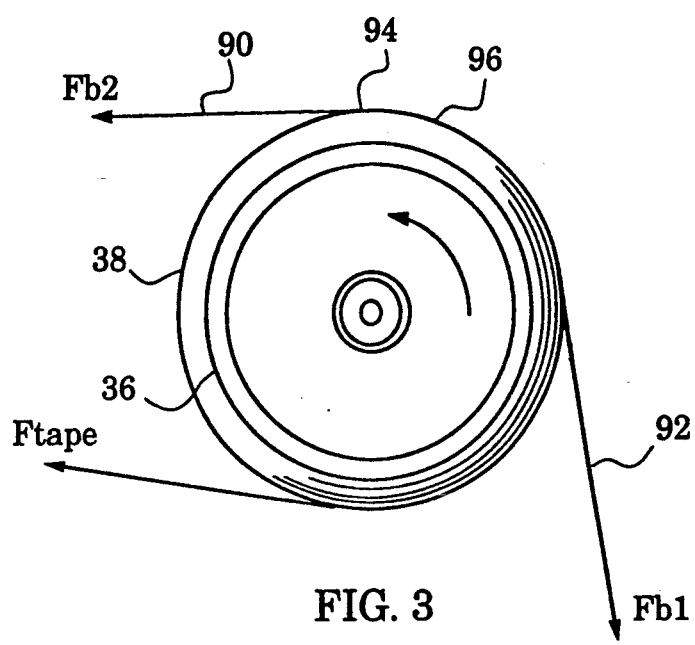

FIG. 3 is an exemplary force diagram illustrating the tensions on belt 40 with reference, for example, to take up reel 36 of FIG. 1. Of course, either reel 36 or 34 (FIGS. 1, 2) can function as the take up reel depending upon the direction of tape motion. Fb1 represents the force exerted by the belt 40 when it moves onto the take up reel 36 from the belt guide roller 46 (FIG. 1). Fb2 represents the belt force applied by the belt 40 when it moves away form the take up reel 36 towards the belt drive roller 42 (FIG. 1). Ftape represents the tape tension when it is wound onto the take up reel 36. It can be seen that the belt tension is higher on the departure side 90 of the belt than on the incoming side 92 because the departure belt tension Fb2 is the sum of the tape tension Ftape and the incoming belt tension Fb1. For example, if the incoming belt tension Fb1 is 16 ounces and the tap tension Ftape is 3 ounces then the belt tension Fb2 on the departure side 90 has a tension of 19 ounces.

Therefore the belt 40 will be stretched more at the departure side 90 of the take up reel. This stretching will not occur instantaneously but over some distance between the departure point 94 and a slip point 96 upstream along the belt as determined by the coefficient of friction between the tape 38 and the belt 40. For a large coefficient of friction $\mu_1$ the distance between the departure point 94 and the slip point 96 will be small, while for a small coefficient of friction $\mu_2$, it will be large.

Figure 4:
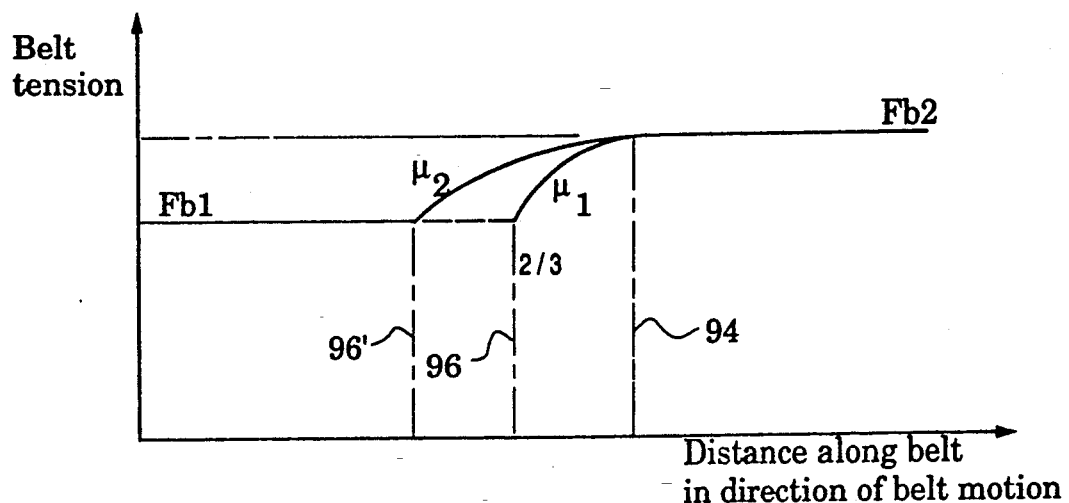

FIG. 4 is a graph of belt tension as a function of distance along the belt in the direction of belt motion on the take up reel of FIG. 3. For the large coefficient of friction $\mu_1$, the belt tension is Fb1 along the belt until the slip point 96 is reached. Once the belt has passed the departure point 94 the belt tension remains Fb2. In the transitional area between Fb1 and Fb2, the belt tension will follow a profile determined by the coefficient of friction. For a smaller coefficient of friction $\mu_2$, the slip point 96' is farther from the departure point 94.

When $\mu_1$ is the static coefficient of friction and $\mu_2$ the dynamic coefficient of friction of fa belt, it can be seen from FIG. 4 that the profile begin followed at a particular instant is determined by whether static or dynamic friction is dominant at that instant. Belts that have a high static coefficient of friction $\mu_1$ and a low dynamic coefficient of friction $\mu_2$ have a tendency to stick to the tape prior to slipping and stretching to a distance defined by the lower dynamic coefficient of friction $\mu_2$. The slip point 96, consequently, moves back and forth on reel 36. It should be noted that the value of the coefficient of frictions and the belt tension have to be chosen in such way that under maximal acceleration there is no complete slippage between belt and either tape reel.

This type of oscillation is called slip-stick motion and has a detrimental effect on tape tension. The tape dynamically balances the torques on the take up reel and the stress variations of the belt on the take up reel will cause significant tape tension variations. These tape tension variations cause speed variations at the transducer head 60 (FIG. 1) which reduce the accuracy of data readout. The present invention is directed primarily to a drive configured to reduce the difference between the dynamic and static coefficients of friction, between the contacting surfaces of the belt and tape, to thus reduce tape tension variations without the necessity of roughening the belt surface as, for example, is taught in cited U.S. Pat. No. 4,466,564.

In accordance with the present invention, the drive belt 40 is integrally formed of an elastomer material 100, e.g., TUFTANE TF-330, having high slip and smooth nontextured surface characteristics. TF-330 comprises an aromatic polyester polyurethane film having the following properties

| TYPICAL FILM PROPERTIES | TF-330 |
| --- | --- |
| Hardness (Shore A) | 93 |
| Specific Gravity | 1.22 |
| Approx. Yield (ft.$^2$/lb./mil) | 157 |
| Tensile Strength (psi) | 6500 |
| 100% Modulus (psi) | 1100 |
| 300% Modulus (psi) | 3000 |
| Elongation (%) | 450 |
| Tear Strength (pli) Die C | 650 |
| Abrasion Resistance (mg wt. loss) Taber w/CS-17 wheels with 100 g load/5000 cycles at 230° C. | 2.6 |
| Natural Appearance | Hazy |
| Slip Characteristics | High |
| Weldability | Fair |
| Vacuum Formability | Excellent |
| UV Stability | Fair |

The high slip and smooth nontextured (e.g., average surface roughness less than 7 microinches, zero to peak, as measured by a Talysurf 10 surface analyzer set for a 0.003 cut off length) characteristics of the drive surface of belt 40, engaging the surface of tape 38, provide coefficients of static and dynamic friction between the surfaces which are very close in magnitude. Using TUFTANE TF-330, most belt samples yield measurements whose ratios approximate 1.2, well within the desired upper range limit of 2.

Figure 5A:
Figure 5B:
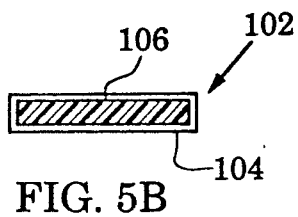

Another embodiment, in accordance with the current invention, is shown in the sectional view of FIG. 5B of a belt 102. The belt 102 has a thin coating 104 of a polyester polyurethane, e.g., TUFTANE TF-330 formed over a base belt 106 of compatible material.

Although experiments have demonstrated the particular suitability of TUFTANE TF-330 to provide the aforedescribed belt surface characteristics, it is recognized that other available materials, may also naturally provide a smooth nontextured surface and possess slip characteristics sufficient to achieve a ratio of static to dynamic coefficients of friction of less than 2. It is accordingly intended that the appended claims be interpreted to cover not only the disclosed embodiment, but all functional and structural equivalents.

I claim:

1. A tape cartridge comprising:
a first reel mounted for rotation around its axis;
a second reel mounted for rotation around its axis;
a flat elongate magnetic tape extending between said reels having at least one end of said tape convolutely wound on one of said reels;
tape guide means for bidirectionally moving said tape along a defined path from one of said reels to the other of said reels;
a closed loop elongate drive belt having a drive surface;
belt guide means supporting said drive belt for movement along a defined path maintaining an elongate portion of said drive surface in contact with an elongate portion of a surface of said tape;
said belt drive surface having an average surface roughness less than 7 microinches zero to peak and a frictional characteristic relative to said tape surface such that the ratio of static to dynamic coefficients of friction between said surfaces is less than 2.

2. The tape cartridge of claim 1 wherein said belt drive surface comprises a polyester polyurethane material.

3. The tape cartridge of claim 1 wherein said drive belt is integrally formed of a polyester polyurethane material having high slip characteristics.

* * * * *